United States Patent [19]
Hardwig

[11] 3,708,057
[45] Jan. 2, 1973

[54] SYSTEM FOR SORTING MAIL BAGS
[76] Inventor: Ernest B. Hardwig, P.O. Box 2685, Jacksonville, Fla. 32203
[22] Filed: July 2, 1971
[21] Appl. No.: 159,390

Related U.S. Application Data

[62] Division of Ser. No. 47,812, June 19, 1970, Pat. No. 3,655,030.

[52] U.S. Cl.................................................198/38
[51] Int. Cl............................................B65g 43/00
[58] Field of Search...........198/38, 180, 41, 179, 210

[56] References Cited

UNITED STATES PATENTS

| | | | |
|---|---|---|---|
| 1,986,420 | 1/1935 | Webb et al. | 198/38 |
| 3,282,400 | 11/1966 | Jonson | 198/43 X |
| 3,314,675 | 4/1967 | Rothfuss et al. | 271/7 X |
| 3,233,720 | 2/1966 | Atanasoff et al. | 198/38 |

Primary Examiner—Evon C. Blunk
Assistant Examiner—Douglas D. Watts
Attorney—George H. Baldwin et al.

[57] ABSTRACT

A sorting apparatus comprising a train of carriers each having a tiltable support provided with a gripper device for releasably retaining an empty mail sack on the carrier. The carriers follow a loop track and are advanced therealong to and past a loading station and a plurality of unloading stations. Each carrier includes a coding device which may be set by an operator at the loading station at the time an empty sack is positioned in the gripper device. A cyclic drive is provided which includes an endless chain carrying a pawl in a path which approaches the track to engage the pawl with a carrier and move the train a predetermined distance, which is an even multiple or submultiple of the distances between loading and unloading stations, and then departs therefrom to disengage the pawl. As a carrier reaches the loading station, it trips an indexing device which stops that carrier and, accordingly, the train, in proper position. The pawl in departing from the carrier contacts the indexing device and returns it to retracted cocked condition removing the stop element from the path of the carrier, whereby the train may again be moved upon engagement of the pawl with the next carrier. Code sensing arrangements are located at the unloading stations operative to actuate mechanism to tilt the support of a correspondingly coded carrier. In tilting, the support moves the gripped sack laterally, and releases the gripper device. Mechanism at the station is also actuated to restrain the lower portion of the sack against lateral movement whereby the sacks are deposited in horizontal position on a table at the station one on top of the other to form a stack.

6 Claims, 11 Drawing Figures

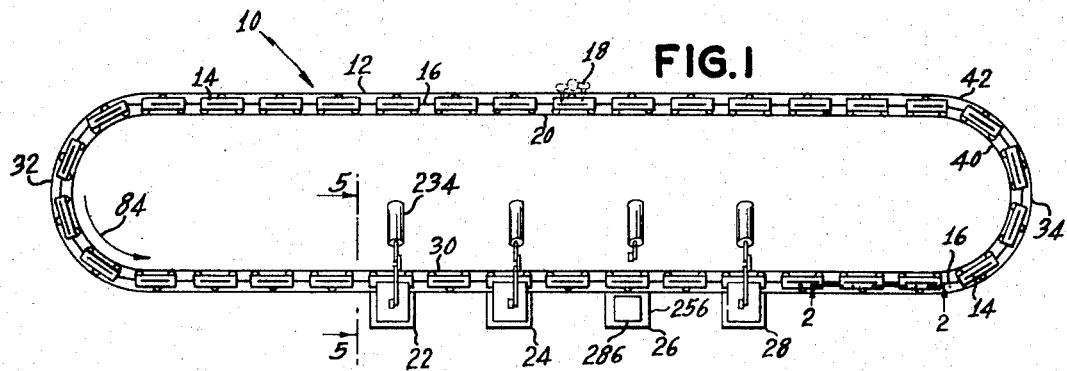
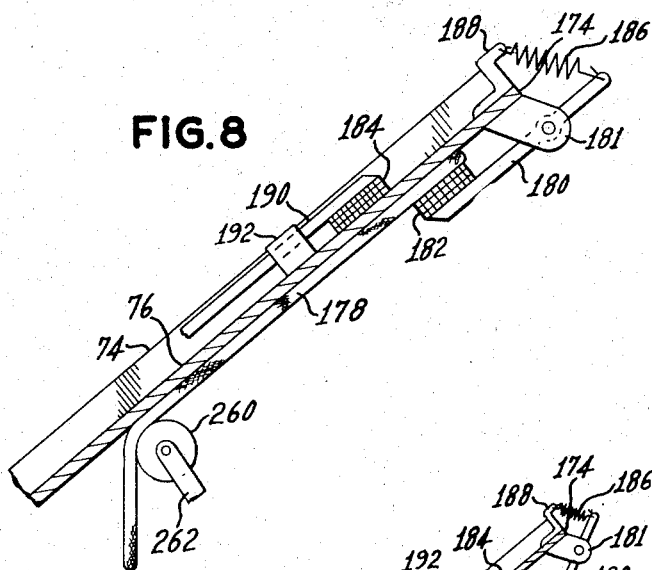
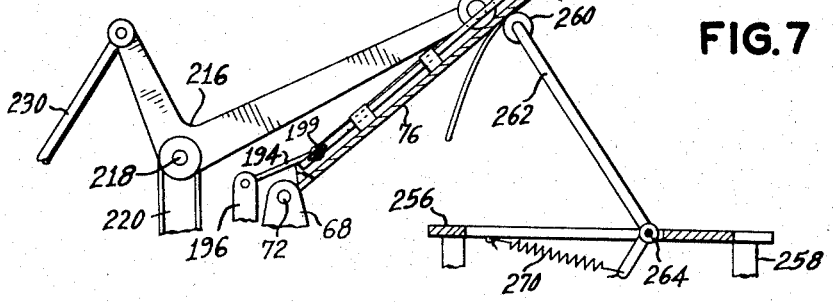

INVENTOR
Ernest B. Hardwig
BY
George H. Baldwin
ATTORNEY

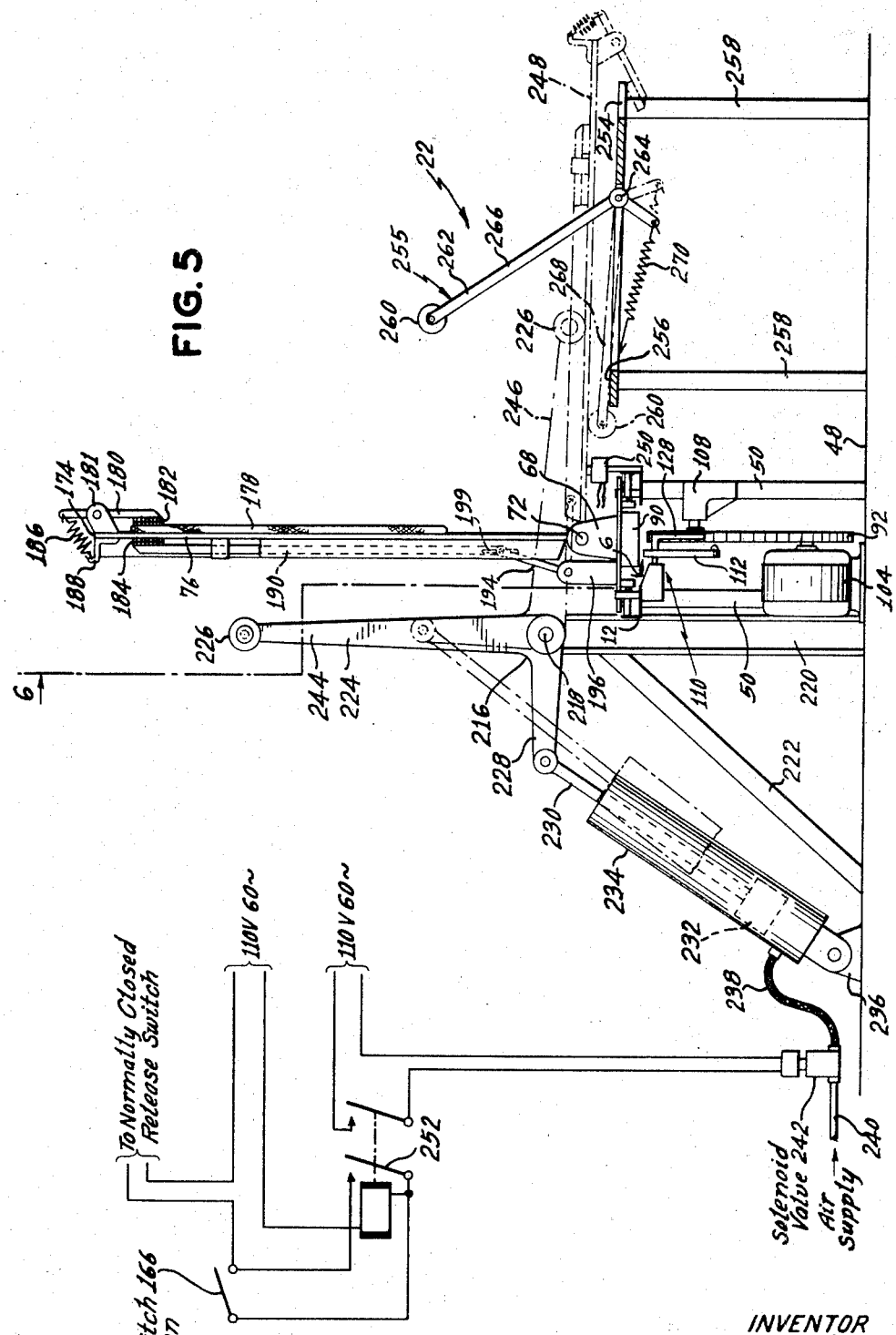

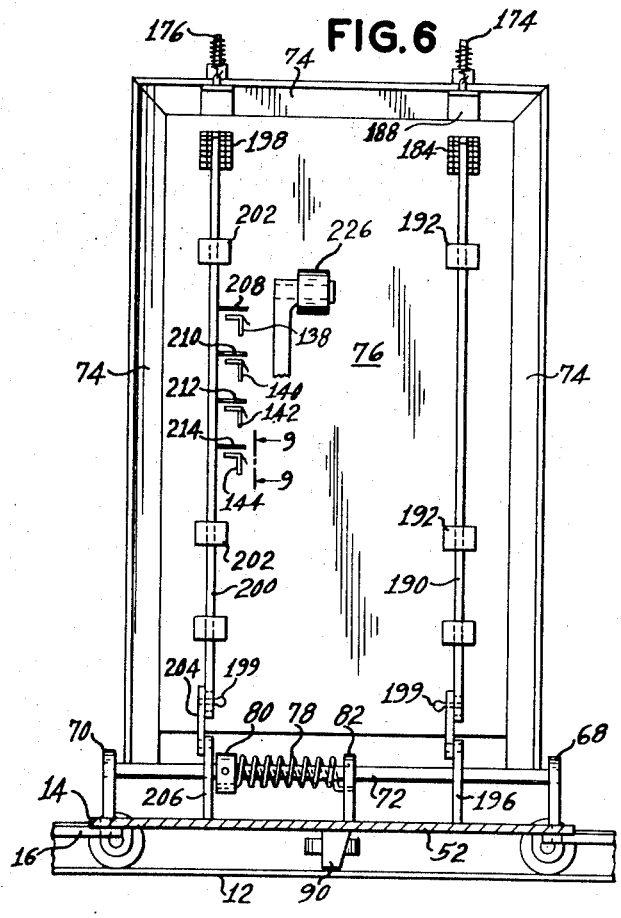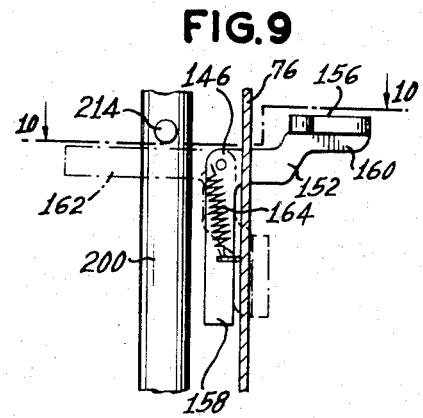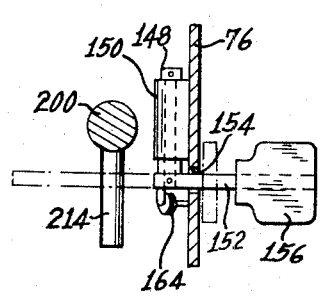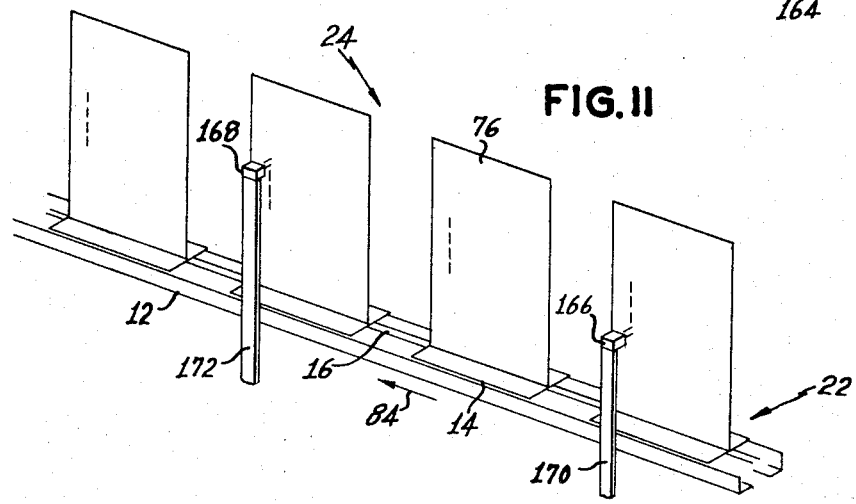

SYSTEM FOR SORTING MAIL BAGS

This Application is a division of my copending application Ser. No. 47,812, filed June 19, 1970, now Pat. No. 3,655,030, entitled "System for Sorting Mail Bags."

An object of the invention is to provide an empty mail bag carrier having a gripper device adapted to quickly and easily grasp an empty mail bag and to quickly and easily release the same onto a horizontal stack at the selected unloading or collection station.

The invention further relates to apparatus for conveying, sorting and stacking flexible articles, such as empty mail bags and the like, the sorting and stacking being performed in a rapid and accurate manner.

Certain of the detail mechanisms of the present invention and the overall combination bear resemblance to prior art mechanisms and systems, such as are exemplified in the following U.S. Pat: No. 2,686,588 - Hoban; No. 2,526,536 - Bryan et al.; Re. No. 16,195 - Baitinger; No. 1,353,996 - Hall; No. 1,681,859 - Jones; No. 2,516,985 - Hecht; No. 2,614,506 - Mullerheim; No. 2,669,323 - Hilliker; No. 2,804,965 - Anderson et al.; No. 3,092,235 - Kemp; No. 3,269,524 - Canfield; No. 3,282,400 - Jonson; No. 3,286,811 - McWilliams; No. 3,314,675 - Rothfuss et al., and No. 3,373,623 - Gutting. Such prior art fails, however, to teach mechanisms or systems which could be adapted in any obvious manner to achieve the results or perform the functions of the apparatus and system described and claimed herein.

The invention herein is particularly applicable to the sorting of empty mail sacks or bags as used in postal systems. Such empty sacks are collected at a mail terminal, for example, and must be checked to remove any envelopes or other articles which may remain in the sack after normal emptying; for condition, i.e., whether in good condition or requiring repair before further use or beyond repair and ready to be discarded; and for size or type. In accord with this invention, an operator or inspector at the loading station picks bags one at a time from a group fed to him, for example, by carts or conveyor, inspects the bag for emptiness, condition, size or type, clips the bag to the carrier at the station and codes the carrier to deliver the bag to a selected unloading station. There may be, for example, three unloading stations for three different sizes of bags in good condition, one unloading station for bags requiring repair and a fifth for bags beyond repair. Of course, the number of unloading stations, and the number of coding possibilities of the carrier, will be selected to conform to the number of types, sizes, conditions and the like into which sortation is desired. Thus parcel post, air mail, foreign mail, and surface mail bags may be sorted, and there may be different sizes of some or all of such different types, requiring one unloading station for each such size of each such type.

Each unloading station is preferably provided with a lowering spring-supported table or pallet onto which the bags are horizontally deposited, the springs operating to maintain the top of the stack at a predetermined constant height. The stacks of bags are removed periodically from each station manually or, if desired, by known conveyor or other transporting means.

The novel features which are believed to be characteristic of this invention are set forth with particularity in the appended claims.

The invention itself, however, both as to its organization and method of operation, together with further objects and advantages thereof, may best be understood by reference to the following description taken in connection with the accompanying drawings, in which:

FIG. 1 is a top plan view of the improved empty bag or sack sorting apparatus of this invention;

FIG. 5 is an enlarged cross-sectional view taken along line 5—5 of FIG. 1;

FIG. 6 is an enlarged cross-sectional view taken along line 6—6 of FIG. 5;

FIG. 7 is a view, similar to FIG. 5, showing portions of the apparatus depicted in FIG. 5 in a second position after partial operation of the apparatus;

FIG. 8 is an enlarged view of a portion of the apparatus depicted in FIG. 7 showing the same at another point in its operation.

FIG. 9 is an enlarged cross-sectional view taken along line 9—9 of FIG. 6;

FIG. 10 is a transverse sectional view taken along line 10—10 of FIG. 9; and

FIG. 11 is an enlarged perspective view of a portion of the apparatus shown in FIG. 1.

DESCRIPTION OF THE PREFERRED EMBODIMENT

Figure 2:
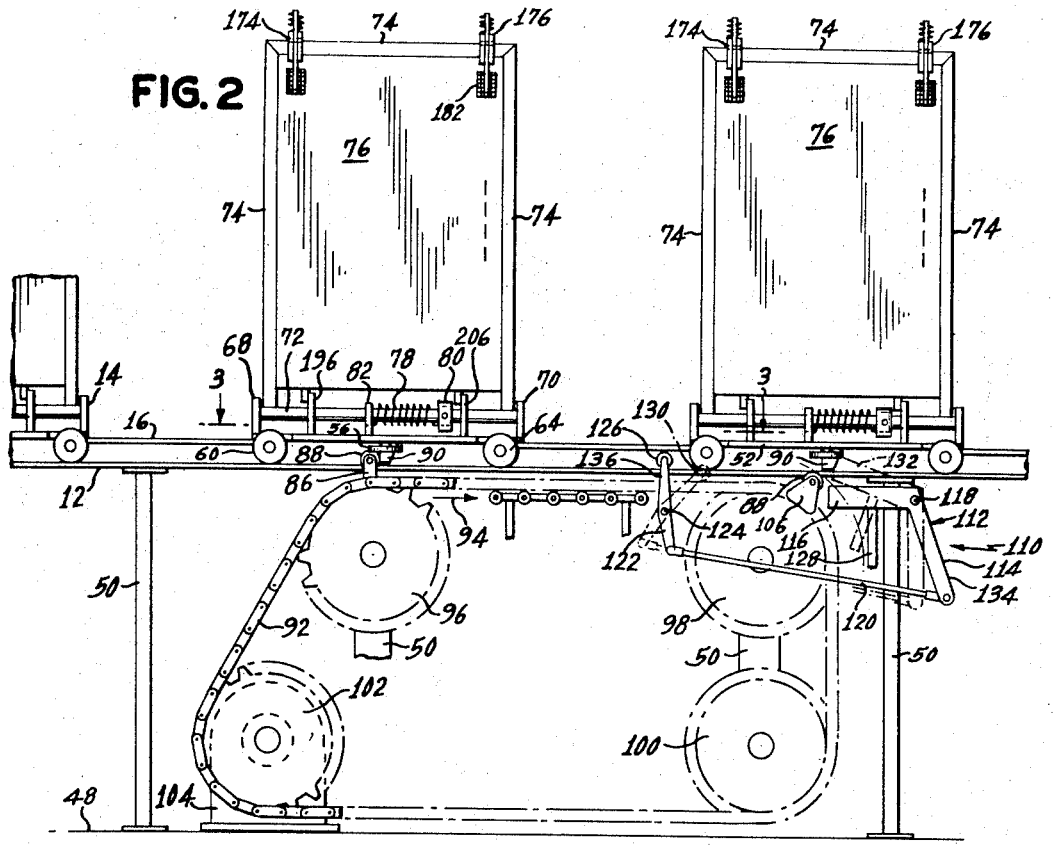
FIG. 2 is an enlarged transverse sectional view taken along line 2—2 of FIG. 1.

With detailed reference to the drawings, and in particular to FIG. 1, the improved sorting apparatus 10 for empty bags and the like, is seen to include a closed loop track 12 along and around which a plurality of vehicles or carriers 14 travel. Carriers 14 are connected together each to the next by substantially rigid connecting bars or links 16 into a train, and said links 16 maintain the carriers 14 spaced apart a distance approximately equal to one-half the length dimension of each carrier 14.

The sorting apparatus for empty bags 10 of this invention is run and attended by a single attendant 18 who is usually positioned along one of the straight runs or sides of the track or conveyor path, as at loading station 20, while a plurality 22, 24, 26 and 28 of sortation or stacking stations are positioned along typically the straight run or side of the track conveyor opposite operator 18, as at 30.

Figure 3:
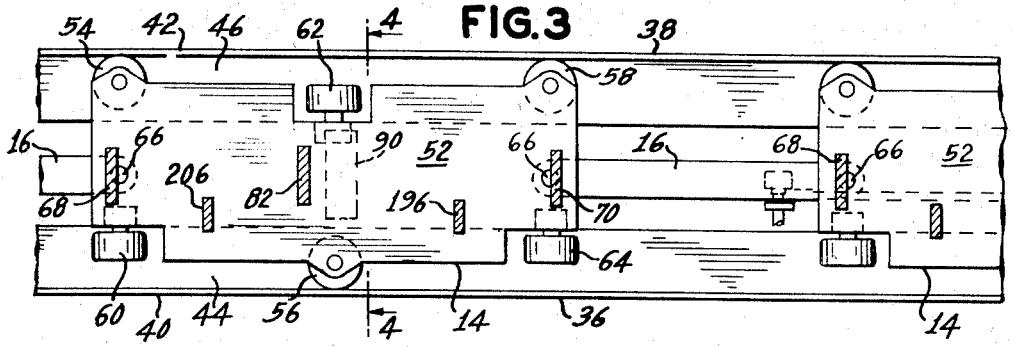
FIG. 3 is an enlarged transverse sectional view taken along line 3—3 of FIG. 2.
Figure 4:
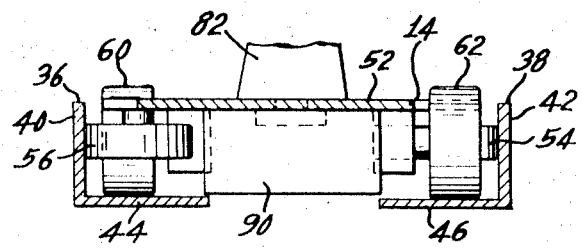
FIG. 4 is an enlarged cross-sectional view taken along line 4—4 of FIG. 3.

Track 12 includes a pair of spaced L-shaped rails 36 and 38, as can be more readily seen in FIGS. 3 and 4. The rails 36 and 38 have vertical walls 40 and 42, and horizontal legs 44 and 46 over and along which the carriers 14 move, the carriers being retained on the rails of track 12 by the generally vertical side walls 40 and 42. Rails 36 and 38 of track 12 are mounted on and maintained spacedly above floor 48 by means of a plurality of posts or columns 50 as can be seen in FIGS. 2 and 5.

Each of the carriers 14 includes a generally horizontal base or platform 52 positioned between rails 36 and 38 of the track 12, and is supported on rails 36 and 38 and therebetween by six (6) small wheels or rollers. Three of the wheels or rollers 54, 56, and 58 are in contact with and roll along the vertical side walls 40 and 42 of the rails 36 and 38 maintaining each carrier 14 therebetween, with two of these three rollers being positioned adjacent the end portions of one side of base 52 and the third being positioned adjacent the mid-portion of the opposite side thereof. The other three of the six wheels or rollers 60, 62 and 64 are in contact with and roll over the generally horizontal legs 44 and 46 of the rails of track 12, maintaining each carrier 14 in rolling contact therewith, with two of these three wheels being positioned adjacent the end portions of one side of base 52 and the third being positioned adjacent the mid-portion of the opposite side thereof. A connecting link or bar member 16 is pivotally attached to each end portion of base 52 of each carrier 14 by a pin 66 extending therethrough, thereby forming a train of carriers.

Mounted on base 52 of each carrier 14, as best seen in FIGS. 3 and 6, is a pair 68 and 70 of supporting and mounting posts or brackets positioned closely adjacent the respective ends of said carrier. A rod 72 is pivotally positioned in and connected to mounting posts 68 and 70 and has attached thereto angular frame members 74 on which a thin panel member 76 is mounted. Panel member 76 is formed of plastic or other non-magnetic material, and is generally enclosed by frame members 74 which give strength and rigidity thereto, all as can best be seen in FIG. 6. Panel 76 and surrounding angular frame members 74 are pivotal with, and about the longitudinal horizontal axis of, rod 72 from a generally vertically upright position to a generally horizontal position as can be seen in FIG. 5. Panel 76 and its frame members 74 are maintained in their generally vertical position by a coiled spring 78 encircling rod 72. A mounting member 80 secures one end of spring 78 to rod 72, while the opposite end of spring 78 engages a post 82 fixed to base 52 of the carrier as seen in FIG. 6. Panel 76 and its frame form a tiltable support for a bag gripper.

The carriers 14, and more particularly the train thereof, are driven or propelled along and about the closed loop track 12 in the direction of arrow 84 by a driving pawl 86 including a roller 88 rotatably mounted adjacent the outer end portion thereof. Roller 88 of pawl 86 contacts and engages a driving lug 90 which is fixed to the mid-portion of platform 52 of each carrier 14, and which depends downwardly therefrom into the path of pawl 86, all as can be clearly seen in FIGS. 2 through 4. Driving pawl 86 is mounted on a continuous flexible member in the form of sprocket chain 92, extending generally outwardly therefrom, and the pawl moves with chain 92 in the direction of arrow 94 as the chain traverses its closed path. Chain 92 passes over a plurality of sprockets 96, 98, 100 and 102 which determine its path of movement and the path of pawl 86. One of the sprockets, as for example sprocket 102, is driven by a motor 104 mounted on floor 48 to drive chain 92.

Each carrier 14 is driven in the direction of arrows 84 and 94 by pawl 86 only while pawl 86 moves over that section of the chain's path between sprockets 96 and 98, after which pawl 86 departs from driving lug 90, and follows the other three sections of the course of chain 92 from sprocket 98 over sprockets 100, 102, and back to the upper side of sprocket 96 to repeat the cycle. In this manner each carrier 14 is cyclically moved, and is stationary in front of operator 18 for the loading thereof, for a predetermined period, during which other carriers remain at sortation stations 22 – 28 for discharge of the empty bag loaded thereon. Thus, while pawl 86 moves from its position adjacent the upper portion of sprocket 98, as at reference numeral 106, down and around the three remaining sides or sections of the course of chain 92 and back up to its position adjacent the upper surface of sprocket 96 (see FIG. 2), the train of carriers is stationary so that the operator 18 may place an empty sack on the particular carrier 14 in front of him, while other carriers positioned adjacent sortation stations 22 through 28 may be unloaded. As pawl 86 moves over that portion of its path between sprockets 96 and 98, pawl 86 is in contact with a lug 90 of one carrier and moves the train and all of the carriers 14 thereof forward one complete position, corresponding to the distance between sprockets 96 and 98. The speed at which the sortation operation takes place can be varied by varying the speed of motor 104 driving sprocket chain 102. Sprockets 96, 98 and 100 are rotatably mounted on brackets 108 attached to supporting columns or posts 50, or other like members, extending between floor 48 and track 12, as can be seen in FIG. 5.

To insure that each carrier 14 stops directly in front of operator 18 at the loading station 18, and also directly in front of and in registry with the sortation stations 22 through 28, a registration indexing mechanism 110 is mounted to the under side of track 12 adjacent sprocket 98, and to one side of the same, so that chain 92 and pawl 86 do not interfere with the operation of the indexing mechanism. Indexing mechanism 110 includes an obtuse L-shaped lever 112 having legs 114 and 116, lever 112 being frictionally mounted on a pin 118 just below track 12 for pivotal movement thereon. An elongated connecting rod 120 has one of its end portions pivotally attached to the end portion of leg 114 of lever 112 and its other end portion pivotally connected to one end portion of an operating element 122. Operating element 122 is mounted just below track 12 on a pin 124 for pivotal movement thereabout, and its other or upper end portion includes a roller member 126 rotatably mounted thereto. Leg 116 of L-shaped lever 112 has a tab 128 fixed to its mid-portion and depending downwardly therefrom in a generally perpendicular manner.

As lug 90, when driven by pawl 86, strikes roller 126 on the upper end portion of operating element 122, the pawl deflects the upper end of element 122 to the right, or clockwise, and downwardly into its dashed-line position 130, thereby, through rod 120, tripping L-shaped lever 112 to pivot clockwise into its dashed-line position 132. This places leg 116 of lever 112 of indexing mechanism 110 in its extended or stop position. When lug 90 reaches the outer end portion of leg 116 it is stopped, thereby stopping the entire train of carriers 14, with one of the carriers 14 in registry with operator 18 at his position of operation, and others in registry with sortation stations 22 through 28. Simultaneously, pawl 86 continues to move with chain 92 about sprocket wheel 98, departing from contact with lug 90 so that the carriers 14 are not driven further but remain stationary. Continued movement of pawl 86 causes it to engage depending tab 128, thereby pivoting L-shaped lever 112 back into its solid line retracted position 134, and effecting movement of element 122 through connecting rod 120 into its position shown in solid lines at 136. In this manner the indexing mechanism 110 is returned to its original cocked position ready for operation by the lug 90 of the next carrier 14 within the train of carriers as pawl 86 completes a cycle and once again encounters lug 90. It will be seen that the friction pivot at 118 acts as a simple detent mechanism to retain lever 112 in one and the other of the two positions into which it is operated by the lugs 90 and the pawl 86 respectively.

Each carrier 14 includes a coding system, positioned along the right front and left rear side of panel 76, which includes four coding keys 138, 140, 142 and 144 as best seen in FIG. 6. Each coding key 138 through 144 includes portions extending through openings in panel 76, as can be more readily seen in detail in FIGS. 9 and 10, wherein coding key 144 is depicted. Each coding key 138 through 144, as with coding key 144, includes an L-shaped member 146 mounted to a shaft or pin 148, which in turn is mounted in a bushing 150 for pivotal movement, the bushing 150 being fixed to the back or rear side of panel 76. L-shaped member 146 includes a leg 152 extending through opening 154 in panel 76, so as to be exposed at the front side thereof, and a key or finger tab 156 is attached to the outer end of leg 152. L-shaped member 146 includes also a second leg 158 which is positioned on the rear or back side of panel 76. Obviously, member 146 may be pivoted from a non-coded position 160, shown in solid lines in FIG. 9, to a coded position 162, shown in dashed-lines in FIG. 9. Member 146 is provided with an over-center coil spring 164, one end of which is attached thereto and the other end of which is attached to panel 76, to urge the L-shaped member to remain in the coded or non-coded position into which it is operated.

The coding system of the sorting apparatus of this invention further includes four coding switches, two of which are depicted at reference numerals 166 and 168 in FIG. 11. These switches are mounted on respective coding switch posts or columns 170 and 172 for contact and operation thereof by respective coding keys 144 and 138, for operation of the empty bag release mechanism as will be described hereinbelow. Equal numbers of coding switches and coding keys are provided, and there is, in the preferred embodiment, a number of sortation stations equal to the number of keys. While four sortation stations and four coding keys are depicted in the drawings, it will be understood that more or less than four may be provided as desired. Only two coding switches 166, 168 are shown in the drawings for simplicity but it will be understood that four are required for the proper operation of the specific sorting system described herein.

Each carrier 14 includes a clamp or gripper mechanism 174 and 176, as best seen in FIGS. 5, 6, 7 and 8, such mechanism serving to attach and hold the empty bag 178 to the front of gripper support panel 76 for its movement from the operator's station about the track to its point of discharge and release from panel 76 at one of the sortation stations 22 through 28. Each clamp or gripper mechanism 174 and 176 includes an elongated member 180 pivotally mounted adjacent its mid-portion on a bracket 181 attached to the upper edge portion of frame 74 of panel 76. Attached to the lower end portion of pivotal member 180 is a strong permanent magnet 182 which is attracted to a second strong permanent magnet 184 positioned on the back side of panel 76 when the magnets are in juxtaposition and which operate to clamp and maintain an empty bag therebetween and against the front surface of panel 76, as can be more clearly seen in FIG. 5.

A small coil spring 186 extends between the upper end portion of member 180 and an attaching bracket 188 mounted on the rear side of panel 76 and frame member 74 adjacent their upper edge portions. Spring 186 urges permanent magnets 182 and 184 away or apart from each other, such that upon non-alignment thereof, as depicted in FIG. 7, magnet 182 will be released from magnet 184 and pivoted away from panel 76 by spring 186 to release the empty bag or sack 178 which has been retained thereby. This separation of magnets 182 and 184 and release of bag 178 therefrom occurs at each sortation station 22 through 28 so that an empty bag may be released and discharged from the gripper support panel 76 of a carrier 14 positioned in registry therewith.

Permanent magnet 184 is mounted upon the upper end portion of a release rod 190 positioned adjacent the back surface of panel 76 and movable therealong through guides 192 mounted to the rear surface of panel 76. The lower end portion of release rod 190 is pivotally connected to a linkage including rod element 194 which in turn is pivotally mounted to the upper end portion of a mounting post 196 attached to the platform or base 52 of vehicle 14. Upon the pivoting or swinging of the gripper mechanism with panel 76 in a manner to be set forth below, release rod 190 will move downward through guides 192 along the rear side of panel 76, due to the off-setting or off-centering of post 196 as compared to posts 68 and 70, thereby sliding magnet 184 downward, as can be more readily seen in FIGS. 5, 7 and 11.

In order to vary the point in the movement of panel 76 where the sack is released by movement of magnet 184, a lost motion connection 199 may be embodied in rod 190. This lost motion connection may be of any standard construction designed to effect movement of magnet 184 only after some movement of the lever portion of rod 190 by linkage element 194 takes place. In this manner the release of the bag from the magnetic gripping mechanism can be adjusted relatively to the position of panel 76.

Permanent magnet 198 of clamping or holder arrangement 176 is attached, as seen in FIG. 6, to the upper end portion of an elongated release rod 200 which moves upwardly and downwardly adjacent the rear surface of panel 76 through a plurality of guides 202 mounted thereto. The lower end portion of rod 200 is pivotally attached to a linking element 204 which has its lower end portion pivotally connected to a mounting post 206 affixed to base member 52 of carrier 14. Upon tipping of panel 76, magnet 198 attached to the upper end portion thereof moves downwardly along the back surface of the panel, releasing the bag or sack held on the front of the panel, all as can be seen in FIG. 5. Release rod 200 has connected thereto, in a generally perpendicular manner, four coding re-set rods or fingers 208, 210, 212 and 214, which are correlated with respective coding keys 138, 140, 142 and 144, which re-set or uncode each and any of the coding keys which is then in "set" position when release rod 200 moves downwardly through guides 202. Such movement of rod 200 occurs in response to the downward and laterally outward tilting or pivoting of panel 76 as the bag is being discharged therefrom.

It will be noted that movable magnets 184 and 198 slide relatively to panel 76 and are not in contact with the mail sacks. This permits free movement of the magnets for releasing the outer magnets actually in contact with the sacks for swinging away from the sacks under the influence of springs 186.

Each sortation station 22 through 28 includes means for dumping or discharging the empty sack 178 carried on each carrier 14 by the swinging or pivoting of panel 76 thereof, and means for stacking or accumulating the discharged or dumped sacks or bags in a neat and orderly stack of horizontally disposed sacks for later bundling and transportation thereof, all as can be seen in reference to sortation station 22 as depicted in FIG. 5.

Each discharge mechanism includes an L-shaped member 216 which is pivotally mounted on a pin 218 adjacent the upper end portion of a column 220 which is supported at one side of track 12 by bracing members as at 222. L-shaped member 216 includes an elongated arm 224 having a roller 226 rotatably mounted on its upper end portion, and a shorter arm 228 fixed at an angle of approximately 90° to longer arm 224. The outer end portion of arm 228 is pivotally mounted to one end portion of a piston rod 230, the other end of which is attached to a piston 232 within pneumatic cylinder 234 which has its lower end portion pivotally attached to a bracket 236 mounted to floor 48. Pneumatic cylinder 234 is supplied pressurized air through flexible tubes 238 and 240 which are connected to a source of pressurized air through a solenoid operated air valve means 242 which controls the supply of air to the cylinder. L-shaped member 216 is pivotal from its non-operative position 244, as depicted in solid line configuration in FIG. 5, to its operative position 246, as depicted in dashed-line configuration in FIG. 5, when the gripper support panel 76 has been swung or pivoted from its generally upright position to a generally horizontal discharge or dumping position 248 as depicted in dashed-line configuration in FIG. 5. The empty bag 178 is released therefrom to fall into horizontal position.

L-shaped member 216 is operated between positions 244 and 246 by cylinder 234, piston 232 thereof and piston rod 230 connected to member 216. The actual release of the bag 178 from the magnetic holding or clamping mechanism 174 and 176 is incidental to the swinging of panel 76 just described, and is controlled as to actual point of release by lost motion means 199.

A release switch 250 is mounted to track 12 at sortation station 22 (FIG. 5) for contact thereof by panel 76 when the same is pivoted to position 248, whereby the electrical circuit is broken and solenoid valve 242 is closed such that piston 232 within cylinder 234 is driven in the downward or opposite direction by a spring contained within cylinder 234 (or by air pressure if cylinder 234 is a double acting cylinder) to return L-shaped member 216 to position 244 and permit panel 76 to return to its generally upright position, all as seen in FIG. 5.

As a vehicle 14, with its coding key 144 pressed or coded, comes into position or registry for sortation station 22, coded coding key 144 operates and closes coding switch 166 (normally in any open position) thereby energizing a relay 252 and opening solenoid valve 242, whereby air flows through line 238 to pneumatic cylinder 234 to operate L-shaped member, pivot 76 and dump, discharge and release bag 178 retained on the front thereof at this sortation station. When panel 76 reaches position 248, release switch 250 is opened (normally in a closed position), thereby opening relay 252 and permitting the closing of solenoid operated valve 242, the return of L-shaped member 216 to position 244 and panel 76 of carrier 14 to its normally upright position for further movement along track 12. Switches 166 and 250, relay 252 and solenoid operated valve 242 are connected and wired to an appropriate source of electrical energy or power.

Empty bags or sacks, as at 178 are deposited, collected or stacked on stacking tables, as at 254, at each sortation station 22 through 28. Each table 254 includes a generally flat, horizontal top or surface 256 supported by a plurality of generally vertical legs or columns 258 at a height above floor 48 approximately equal to the height of platform or base member 52 of each carrier 14, or at a height slightly thereabove, see in particular FIG. 5. Each stacking table 254 is provided with a frame 255 for accepting and controlling the bags or sacks as they are released from panel 76. This frame includes roller bar or roller member 260 which is rotatably mounted between the end portions of a pair of side arms 262 of the frame 255. Side arms 262 are pivotally mounted to the side edges of table top 256 adjacent their lower end portions, as at 264, for pivoting thereabout from position 266 to dashed line position 268, as seen in FIG. 5. Each side arm 262 has its lower most end portion connected by a coiled spring 270 to table top 256 to urge frame 255 and roller bar 260 into the solid line configuration 266 depicted in FIG. 5.

As panel 76 is pivoted or tipped toward position 248, roller bar 260 engages one side of vertically hanging bag 178, rolling and smoothing the same into a horizontal position on table top 256, and thereby preventing the bag from folding upon itself or otherwise being deposited on table top 256 in other than a smooth manner or fashion, see also FIG. 7. It will be noted that roller bar 260 and frame 255 are moved by contact with the bag and the gripper support panel 76. When roller 260 has been moved with frame 255 by panel 76 and bag 178 to its dashed-line position of FIG. 5, it is beyond the bottom edge of the bag 178, and when panel 76 moves back to a vertical position when released from roller 226 of arm 224, roller 260 and arms 262 of frame 255 move back to the full line position of FIGS. 5 and 7, ready for accepting the next bag. This last movement is by spring 270.

The tables 256 preferably comprise a lowering central section 286, as seen at unloading station 26 in FIG. 1, which receive the sacks in a stack thereon. As each sack is deposited, the table section 286 lowers itself such as by having a weighing spring support thereby to maintain the top sack of the stack at a predetermined elevation. Such automatic lowering tables are well known in the art, and the specific mechanism to be employed forms no part of this invention.

In operation, the operator or attendant 18 checks, inspects and applies an emptied bag to the grippers of the carrier 14 which has paused in front of his station, and he codes the proper coding key on gripper support panel 76 for the particular bag which he has secured on that particular carrier 14. As the loaded carriers 14 move along and about track 12, the same are unloaded at their proper respective sortation stations 22 through 28 under control of the coding switches, such as 166 and 168, whereby stacks of sorted bags are received and accumulated upon stacking tables 254 for later binding, transportation and use. Unloading is effected by L-shaped levers 216 in cooperation with frames 255 and rollers 260, the gripping mechanism being released as each panel 76 of each carrier 14 is pivoted to swing downwardly and laterally outwardly under pressure of L-shaped lever 216 actuated by pneumatic cylinder 234.

Although the invention disclosed herein has been described and depicted in conjunction with four sortation stations 22 through 28, as mentioned above, more or less may be provided as required or desired, with the only major changes being the provision of any such additional stations and the provision of an equivalent number of coding keys on each carrier 14.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a sorting apparatus for empty sacks, a train of interconnected movably mounted carriers, a support swingably mounted on each said carrier, each said carrier support having a respective gripper device for gripping an empty sack at one edge and for suspending the sack by said gripper device with the sack hanging vertically therefrom, an unloading station, carrier moving means for moving said carriers sequentially to said unloading station, means for stopping the train with a carrier at said station, means responsive to presence of a carrier at said station to swing said carrier support of such carrier downwardly and laterally outwardly thereon thereby to swing said gripper downwardly and outwardly with respect to the carrier with the sack hanging therefrom, and means responsive to said swinging movement for actuating said gripper device to release said sack.

2. The combination according to claim 1 wherein said carriers are provided with coding means and said presence responsive means comprises means responsive to such coding means.

3. In a sorting apparatus for empty sacks, a continuous loop track, a continuous train of carriers linked each to the next around said loop and movable along said track, drive means including a continuous flexible member, an element attached to said member for drivingly engaging said carriers, and means for moving said member in a loop path having one part adjacent said track which said part has a length equal to not less than the distance between adjacent said carriers and less than twice said distance, the remainder of said path being a return part thereof extending between the ends of said one part and being remote from said track, said element being in engagement with one of said carriers during movement along said one part thereby to drive said train intermittently, an upstanding tiltable frame on each said carrier, a clamp element pivotally mounted on each frame manually pivotal from an open position to a closed position, means, including linkage means connected between said clamp element and said carrier, operable in response to tilting of said frame to pivot said clamp element from said closed to said open position, a plurality of unloading stations spaced along said track at multiples of said distance from the point to which a carrier is moved by said element, manually operable coding means on each gripper, code detecting means at each said station actuated by a predetermined code of said coding means, means responsive to actuation of said code detecting means for tilting the frame of the carrier at the station at which such code is so detected, and sack collecting means at each said station underlying the tilted position of the frame of a carrier at the station.

4. The combination according to claim 3 in which each said collecting means includes a sack guide mechanism comprising a spring loaded pivotally mounted arm urged by said spring into an upper position to contact a sack hanging from the clamp element of a frame when the frame has been partially tilted by said tilting means and yieldable against the force of said spring upon further tilting of the frame.

5. The combination according to claim 3 in which an oscillatable stop member is disposed adjacent said track, said stop member being movable between a stop position in the path of a carrier being moved by said carrier engaging element and a retracted position out of such path, and means for oscillating said stop member cyclically between said positions thereof.

6. The combination according to claim 5 wherein said means for oscillating said stop member comprises a remote sensing means for sensing the passage of a carrier past a predetermined point along the track, means connecting said sensing means to said stop member for moving said stop member into its said stop position in response to actuation of said sensing means, and means located in said remainder of said path and disposed to be contacted by said carrier engaging element operative to move said stop member into its said retracted position.

* * * * *